(12) United States Patent
Huang

(10) Patent No.: US 7,345,966 B2
(45) Date of Patent: Mar. 18, 2008

(54) METHOD AND APPARATUS FOR ACHIEVING A SHORT SEEK WITH A STEPPING MOTOR

(75) Inventor: Chia-Ling Huang, Taipei Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 390 days.

(21) Appl. No.: 10/711,507

(22) Filed: Sep. 23, 2004

(65) Prior Publication Data
US 2005/0068862 A1   Mar. 31, 2005

(30) Foreign Application Priority Data
Sep. 25, 2003   (TW) .............................. 92126531 A

(51) Int. Cl.
*G11B 7/00*   (2006.01)
(52) U.S. Cl. ................ 369/44.28; 369/30.17; 369/53.25
(58) Field of Classification Search .............. 369/44.28, 369/30.1, 30.11, 30.15, 30.17, 53.25
See application file for complete search history.

(56) References Cited
U.S. PATENT DOCUMENTS 5,844,394 A * 12/1998 Mushika et al. ............ 318/696
6,288,983 B1 * 9/2001 Jeong ....................... 369/30.36
6,326,756 B1 * 12/2001 Youn ........................... 318/569
6,545,957 B1 * 4/2003 Hiraga et al. ............. 369/44.28
6,693,861 B1 * 2/2004 Lim ......................... 369/44.28
6,759,824 B2 * 7/2004 Kawabata et al. .......... 318/436
6,778,473 B1 * 8/2004 Tomita et al. ............. 369/44.26
6,804,176 B1 * 10/2004 Komazaki ................. 369/30.03
2005/0013220 A1 * 1/2005 Seo .......................... 369/47.36
2005/0041542 A1 * 2/2005 Kobayashi et al. ...... 369/44.28

FOREIGN PATENT DOCUMENTS

EP   0 800 128 A2   10/1997
EP   1 022 730 A2    7/2000

\* cited by examiner

Primary Examiner—Thang V. Tran
(74) Attorney, Agent, or Firm—Winston Hsu

(57) ABSTRACT

A method for controlling a stepping motor in an optical storage system and for achieving a short seek with the stepping motor is disclosed. The optical storage system comprises a pick-up head and object lens, wherein the object lens is movably installed on the pick-up head. The method includes determining a number of steps that the stepping motor should rotate; moving the object lens toward a target track; and utilizing the stepping motor to move the pick-up head toward a target position according to the number of steps that the stepping motor should rotate.

18 Claims, 5 Drawing Sheets

METHOD AND APPARATUS FOR ACHIEVING A SHORT SEEK WITH A STEPPING MOTOR

BACKGROUND OF INVENTION

1. Field of the Invention

This invention relates to a method and an apparatus for controlling a stepping motor in an optical storage system, and more particularly, to a method and an apparatus for implementing a short seek through controlling the stepping motor.

2. Description of the Prior Art

In a common optical storage system, when a user accesses data on an optical disk, a pick-up head moves toward the target track on the optical disk to read or write data. Take an optical disk drive for example with the following description of accessing data and a related driving system. Please refer to FIG. 1, which is a schematic diagram of a prior art optical disk drive 10. The optical disk drive 10 comprises a spindle motor 11 fixed in the optical disk drive 10, a sled motor 12, a sliding rail 14, a sled 15, a pick-up head 16 for reading data, and a control module 18 acting as a control system of the optical disk drive 10 for controlling operations of the optical disk drive 10. In addition, there is an optical disk 22 with a plurality of tracks 24 arranged concentrically around the center of optical disk 22 shown in FIG. 1 for storing data. In this case, the main function of the spindle motor 11 is to carry and spin the optical disk 22 for allowing the pick-up head 16 to access data stored on the optical disk 22. In order to make the optical disk drive 10 capable of successfully accessing data, the sliding rail 14 is placed along a radial direction (i.e., the arrowed direction A0 in FIG. 1) of the optical disk 22, and the pick-up head 16 is placed on a sled 15. The sled 15 moves along the sliding rail 14 and is connected to a sled motor 12, which drives the sled 15 by an actuator, such as a set of gear wheels or lead screws. Accordingly, the pick-up head 16 moves to and fro to conduct a long seek along the sliding rail 14.

Please refer to FIG. 2, which is a side elevational diagram of the embodiment shown in FIG. 1. The object lens 26 is placed movably on the pick-up head 16 and is able to conduct a short seek along the radial direction of optical disk 22, whereby the object lens 26 locks precisely onto the track 24 of optical disk 22 for reading data stored on the optical disk 22. Therefore, the moving distance is an absolute distance shifted by the sled 15 plus a distance shifted by the object lens 26 relating to sled 15, when changing to the desired target track. In other words, the object lens 26 has a fast dynamic characteristic, meaning it moves and stops instantly, while the sled 15 has a slow dynamic characteristic, meaning it moves and stops slowly. When the pick-up head 16 reads data sequentially on the optical disk 22, the sled motor 12 drives the sled 15, thereby bringing the pick-up head 16 within the vicinity of the target position of the optical disk 22, and then drives the object lens 26 to lock onto the target track precisely for accessing data. As the target track changes, the object lens 26 moves slightly in the radial direction of the optical disk 22 while at the same time the object lens 26 shifts away from the center of the pick-up head 16, all of which makes the signal quality worse and the servo system of the optical disk drive 10 unstable. As a result, the control module 18 drives the sled motor 12 causing the sled 15 to bring the pick-up head 16, which moves toward the object lens 26, and to ensure that the object lens 26 is at about the center of pick-up head 16 for acquiring better quality of the optical signal.

When the optical disk drive 10 randomly accesses data on the optical disk 22, it is necessary to "jump" between tracks. The track seeking or track jumping performed by the pick-up head 16 is divided into two categories short seek and long seek according to quantity of tracks between a current position of pick-up head 16 and a target track. The short seek has an allowable maximum distance so that any jumping distance that is longer than the allowable maximum distance is conducted by a long-seeking mechanism. Concerning the long seek, the sled 15 accelerates the pick-up head 16 gradually until a predetermined rate is reached and then slows down the pick-up head 16 as it approaches the target track. The benefit of long seek is quick speed, but it has a drawback of locating a track far from the target track after the long seek is completed. Therefore, the track-seeking operation comprises not only long seek but short seek as well, which is more precise. When the pick-up head 16 performs a short seek, the sled motor 12 will not drive the sled 15 or pick-up head 16 too fast in order to avoid being far from the target track suddenly, which makes the short seek more precise. However, as mentioned above, the short seek only covers a short distance and is slower than the long seek.

Please refer to FIG. 1, we can call the sled motor 12, sled 15, pick-up head 16, object lens 26, and control module 18 of the optical disk drive 10 collectively as a sled servo feedback control system. The sled servo feedback control system drives the sled motor 12 to cause the sled 15 to approach the object lens 26 according to the shift distance between the object lens 26 and the center of the pick-up head 16. In other words, sled 15 moves if and only if there is a shift distance present. When the pick-up head 16 (via the object lens 26) accesses data on the optical disk 22 sequentially, the object lens 26 moves slowly through a short distance. Although sled 15 moves slowly, it is able to follow the object lens 26. During the short seek, the object lens 26 moves forward to the target track quickly across a long distance according to a predetermined speed curve. Please refer to FIG. 3, which is a diagram illustrating the speed curve of the object lens 26 and the sled 15 shown in FIG. 2 and a curve of the shift distance between the object lens 26 and the sled 15. At the beginning of a short seek, the object lens 26 shifts to the target track quickly, which increases the shift distance suddenly. When certain of shift distance is achieved, the shift distance is detected by the sled servo feedback control system, which drives the sled motor 12. According to the slow dynamic characteristic of the sled 15, the object lens 26 becomes separated from the center of the pick-up head 16 by a long distance when the sled 15 starts moving. During this time, when the object lens 26 is seriously apart from the center of pick-up head 16, the quality of optical signal becomes worse, and the system falls into an unstable situation. At the end of the short seek, the object lens 26 reaches the target position and stops according to the predetermined speed curve; however, the sled 15 continues to move forward because the shift distance is not equal to zero. The sled servo feedback control system instructs the sled motor 12 to stop until the shift distance becomes zero. However, the sled 15 cannot stop instantly because of its slow dynamic characteristic. We can see clearly in FIG. 3, when the sled 15 is ordered to stop, the sled 15 continues to move, and the shift distance in the opposite direction increases until the sled 15 stops all because the sled 15 cannot stop instantly. Then the sled 15 moves back across the opposite shift distance. In this way, there is a huge shift distance between the object lens 26 and the pick-up head 16, and the sled 15 that moves to and fro may make the system unstable.

In brief, the prior art uses the shift distance between object lens 26 and sled 15 to control the sled motor 12 for driving the sled 15 and the pick-up head 16 in a short seek. This way may lower the quality of the optical signal and make the system unstable because of the slow dynamic characteristic of the sled 15. The above-mentioned problem can be solved by decreasing the allowable maximum distance of a short seek or slowing down the sled 15 for stability, but these solutions also reduce the efficiency of accessing data and degrade the performance of the optical disk drive.

SUMMARY OF INVENTION

It is therefore a primary objective of the claimed invention to provide a method and an apparatus of utilizing a stepping motor in an optical storage system for driving a sled and a pick-up head in advance for achieving a short seek to solve the above-mentioned problem.

According to the method and the mechanism disclosed in this invention, we use firmware or a digital signal processor to control the actuator of the optical disk drive with a stepping motor for precise positioning. The stepping motor pre-drives the sled (with the pick-up head) of the optical disk drive, but it does not drive the sled according to a shift distance. Instead, the moving distance of pick-up head is calculated, and then converted into a number of steps for the stepping motor before a short seek is started. In the beginning and duration of the short seek, the sled (with the pick-up head) moves to the vicinity of the target position expectably when the object lens moves. At the end of the short seek, the object lens moves upon the target track precisely, and the sled slides slightly or being stop instead of moving, thereby completing the short seek. In this way, the oscillation of the sled is avoided without driving the sled by a shift distance between the object lens and sled, the stability of servo feedback control system of the optical disk drive is improved, and a better quality of signals are provided according to the present invention. Furthermore, the designer of optical storage system can increase the distance of the short seek without reducing the stability and precision of the system.

It is therefore one objective of the claimed invention to provide a method of controlling a stepping motor in an optical storage system for achieving a short seek. The optical storage system comprises a pick-up head. The method comprises calculating a number of steps, which the stepping motor should rotate; and utilizing the stepping motor to move the pick-up head to a target position according to the number of steps.

It is another objective of the claimed invention to provide a method of achieving a short seek in an optical storage system. The optical storage system comprises a stepping motor, a pick-up head, and an object lens. The method comprises: (a) calculating a number of steps that the stepping motor should rotate; (b) after step (a), utilizing the stepping motor to move the pick-up head toward a target position and move the object lens toward a target track at the same time; (c) determining if the object lens has reached the target track, wherein the short seek is finished if the object lens has reached the target track; otherwise, step (d) is performed; and (d) continuing to move the object lens until the pick-up head has reached the target position and then returning to step (c); otherwise, repeating step (d).

An optical storage system according to the present invention comprises a sled movably positioned on the optical storage system; a pick-up head placed on the sled; an object lens movably positioned on the pick-up head; a stepping motor electrically connected to the sled for driving the sled to move the pick-up head and stopping the sled and the pick-up head when a shift distance is lower than a predetermined shift range, wherein the sled and the pick-up head is sped up when the shift distance is greater than the predetermined shift range; and a control module for controlling operations of the stepping motor, the pick-up head, and the object lens.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
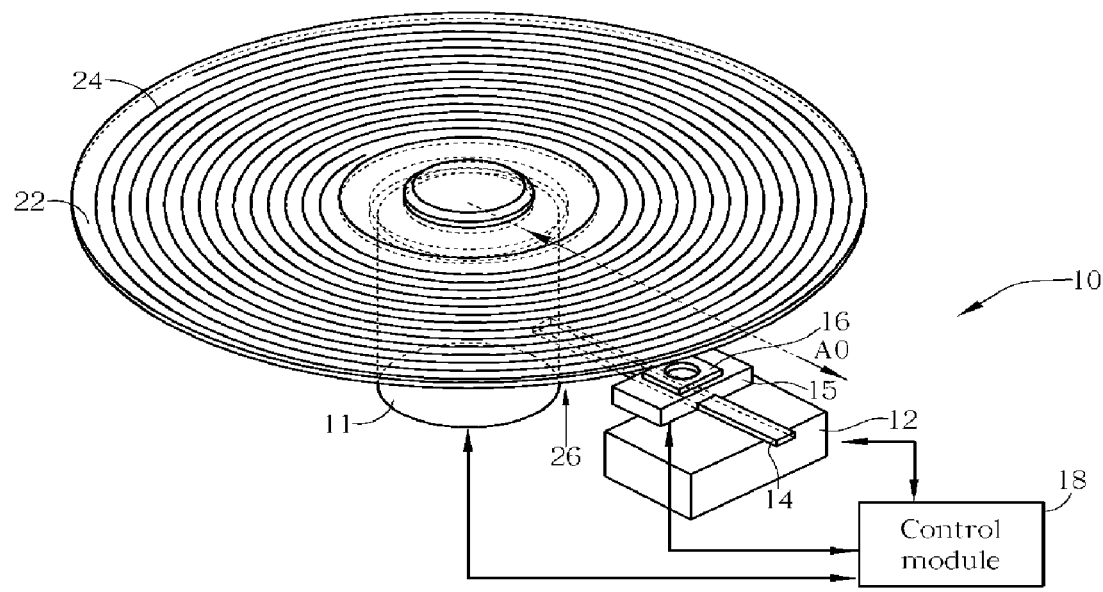
FIG. 1 is a schematic diagram of a prior art optical disk drive.
Figure 2:
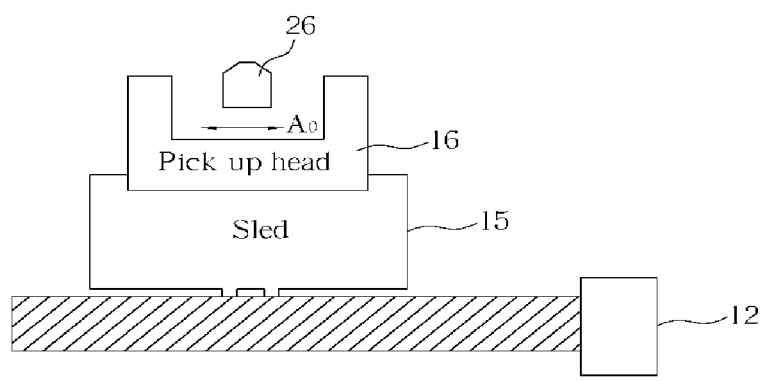
FIG. 2 is a side elevational diagram of the embodiment shown in FIG. 1.
Figure 4:
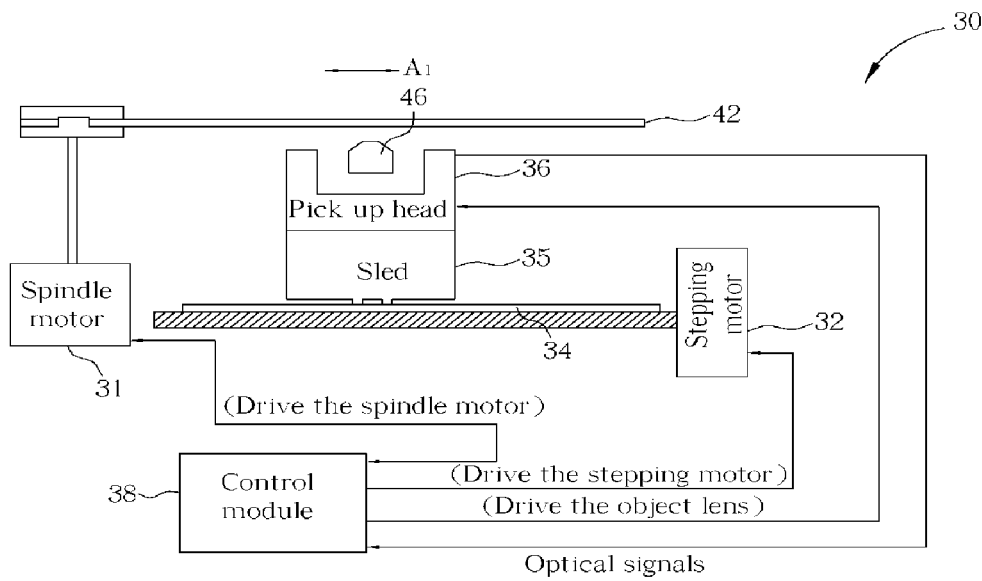
FIG. 4 is a schematic diagram of an optical disk drive according to an embodiment of the present invention.

First, the kernel feature of the present invention is to use a stepping motor for moving a sled and a pick-up head in advance for achieving a precise position. The stepping motor is widely used in the industry, and is available to peripheral devices of computers. In general, the stepping motor rotates in steps. The stepping motor determines the rotated angle according to the quantity of pulses of an inputted square wave signal. The stepping motor stops when no square wave signal is inputted, and rotates at a predetermined angle repeatedly when a square wave signal is continuously inputted. Therefore, the stepping motor can start or stop immediately for precise positioning. In general, a standard stepping motor rotates a great distance for one step, so the optical disk drive system uses a fine-tuning technique to divide a predetermined angle (a step) into several smaller steps, which are all equal. Please note that this technique could be achieved by changing inputted square wave signal to sine wave or triangle wave signal as well. For example, an original step can be further divided into 1, 2, 4, 8, or 16 small steps for precise rotating. The step mentioned in the present invention means the smaller step mentioned above. The method according to the present invention is applied to an optical storage system. Take an optical disk drive for example. The architecture of the present invention is the same as the architecture shown in FIG. 1 and FIG. 2. The present invention focuses, instead, on the control process and usage of the stepping motor. Please refer to FIG. 4, which is a schematic diagram of an optical disk drive 30 according to an embodiment of the present invention. The optical disk drive 30 comprises a spindle motor 31, a stepping motor 32, a sliding rail 34, a sled 35, a pick-up head 36, a set of object lens 46, and a control module 38. Compared with the prior art optical disk drive 10 shown in FIG. 1 and FIG. 2, the optical disk drive 30 replaces the sled motor 12 in FIG. 1 with a stepping motor 32. As shown in FIG. 4, there is an optical disk 42 with a plurality of tracks (not shown) for storing data. When users want to acquire data stored on the optical disk 42 through the optical disk drive 30, the spindle motor 31 rotates the optical disk 42, and the stepping motor 32 drives the sled 35 to and fro along the sliding rail 34. As the sliding rail 34 is placed, orientated in the radial direction (the direction of arrow A1 in FIG. 4), on optical disk 42 and the pick-up head 36 is placed on the sled 35, the pick-up head 36 slides to and fro along sliding rail 34 with any distance by using the stepping motor 32.

Object lens 46 is also placed movably on the pick-up head 36 along the radial direction of the optical disk 42 for locking onto the target track precisely. Take a general optical disk 42 for example. The spacing between tracks of a compact disc (CD) is about 1.6 μm, and the spacing between tracks of a digital versatile disc (DVD) is about 0.74 μm, which are both smaller than a step (about 9-10 μm) of the stepping motor 32. It is clear that object lens 46 is able to move a shorter distance than sled 35 and pick-up head 36. Please refer to FIG. 4. when accessing the data storing on the optical disk 42, the control module 38 has to coordinate the rotating of spindle motor 31, the rotating of stepping motor 32, the shifting of the pick-up head 36, and the data transferring process. The control module 38 is short for the driving system in the optical disk drive 30, wherein the control module 38 comprises software programs, a controller implemented by a DSP, driving chips of the stepping motor 32 and the spindle motor 31, and related hardware circuits. Most processes of the optical disk drive 30 are controlled by the control module 38 such as driving the spindle motor 31 to rotate the optical disk 42, moving the sled 35 and pick-up head 36 by using the stepping motor 32, utilizing the feedback optical signal of the optical disk 42 to shift the sled 35 and pick-up head 36 roughly in the radial direction, and fine-tuning the position of the object lens 46 on the pick-up head 36 at the same time.

Figure 3:
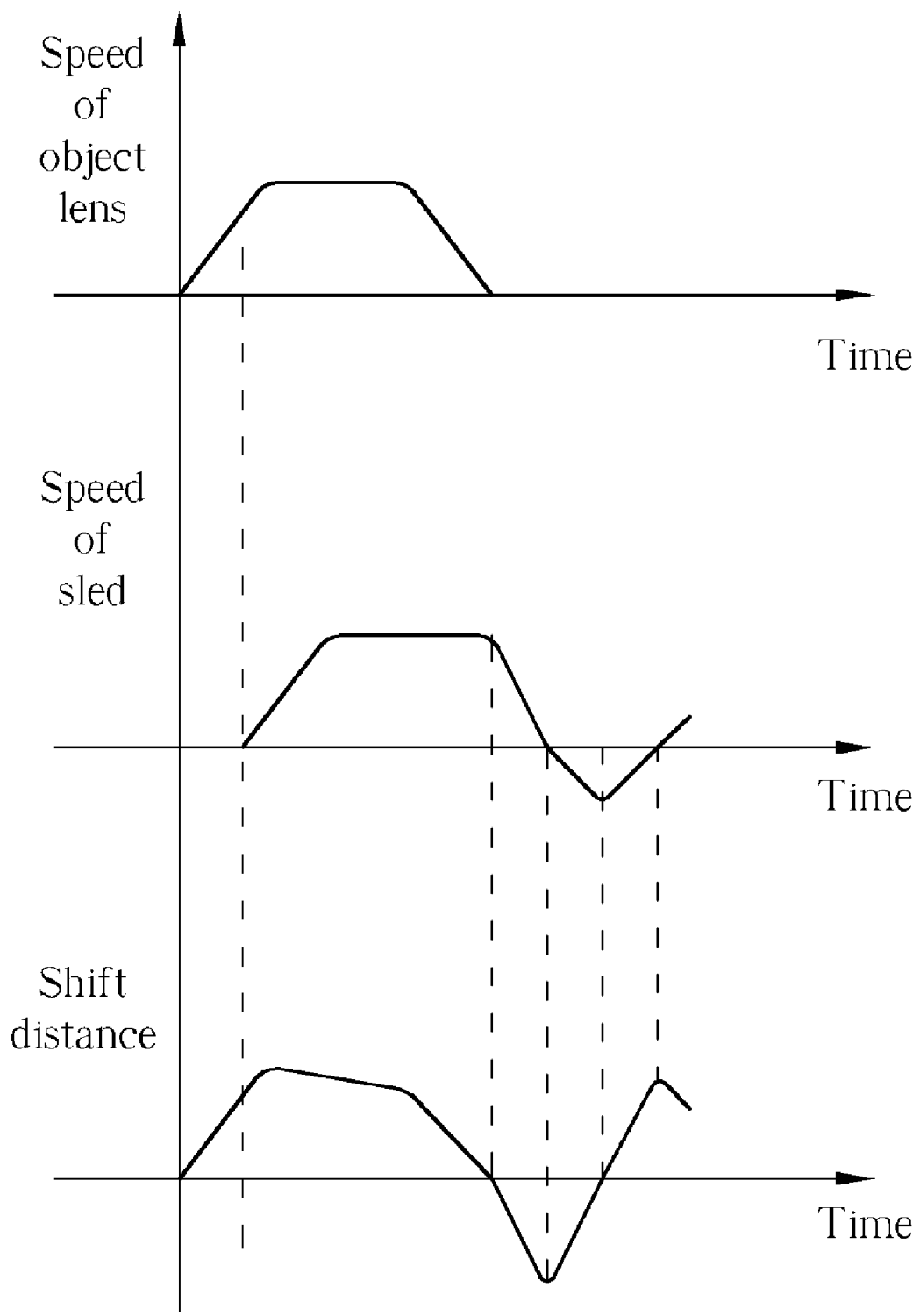
FIG. 3 is a diagram illustrating two speed curves of an object lens and a sled and one curve of the variation of a shift distance.
Figure 5:
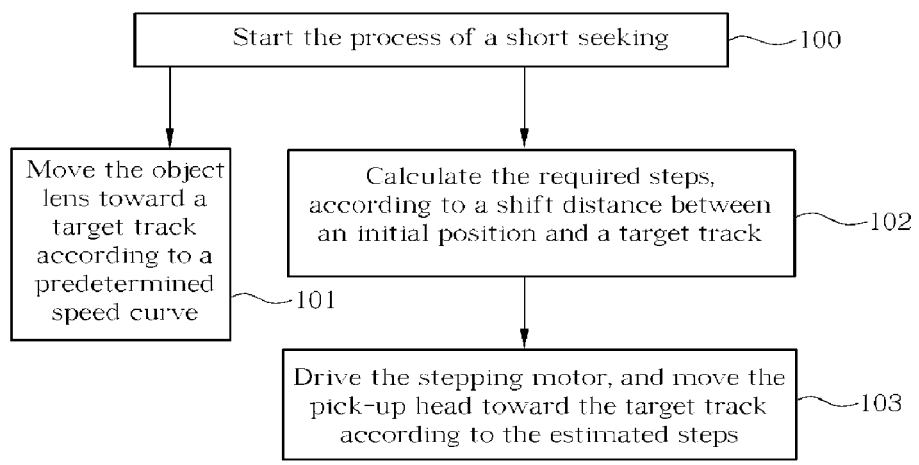
FIG. 5 is a flow chart of a method according to an embodiment of the present invention.

Based on the driving system of the optical disk drive 30 shown in FIG. 4, the features of the method according to the present invention are disclosed with the following embodiment. Please refer to FIG. 5, which is a flow chart of a method according to an embodiment of the present invention. The method of controlling the stepping motor 32 is applied to an optical storage system (such as the optical disk drive 30 shown in FIG. 3) for a short seek. The flow includes following steps:

Step 100: Start the short seek and perform step 101 and step 102 at the same time;

Step 101: Utilize the control module 38 shown in FIG. 4 to move the object lens 46 toward a target track according to a predetermined speed curve for a fast moving and a long distance movement (compared with the distance in sequential accessing);

Step 102: Utilize the control module 38 shown in FIG. 4 to calculate the number of required steps, which the stepping motor 32 should rotate, according to the shift distance between an initial position and the target track, and go to step 103. For example, assume a step for the stepping motor 32 is 20 tracks and the default distance for differentiating a short seek and a long seek is 500 tracks. Therefore, a jumping is implemented with a short seek if the distance is shorter than 500 tracks. When the short seek of 300 tracks is implemented, the control module 38 in FIG. 4 figures out the total number of required steps that the stepping motor 32 should rotate, this case being 15 steps (300/20=15). The process of calculating is performed by a microprocessor of the control module 38 or another digital signal processor. It takes just a little time to estimate the steps with high-speed microprocessor, the amount of time taken being about $10^{-6}$ second for a simple calculation that will not delay the actual driving system; and Step 103: Utilize the control module 38 shown in FIG. 4 to drive the stepping motor 32 and move the pick-up head 36 upon the target track according to the estimated steps. Because step 102 (process of estimating the required steps) only takes a little time, the time when the control module 38 drives stepping motor 32 is almost the same as the time when the object lens 46 starts to move. Continuing with the example in step 102, the control module 38 drives the stepping motor 32 to rotate 15 steps until the pick-up head 36 is upon the target position. Please refer to FIG. 4, because the pick-up head 36 is placed on the sled 35, which is connected to the stepping motor 32, the stepping motor 32 drives the sled 35 to move, and then the sled 35 drives the pick-up head 36 toward the target position actually.

Figure 6:
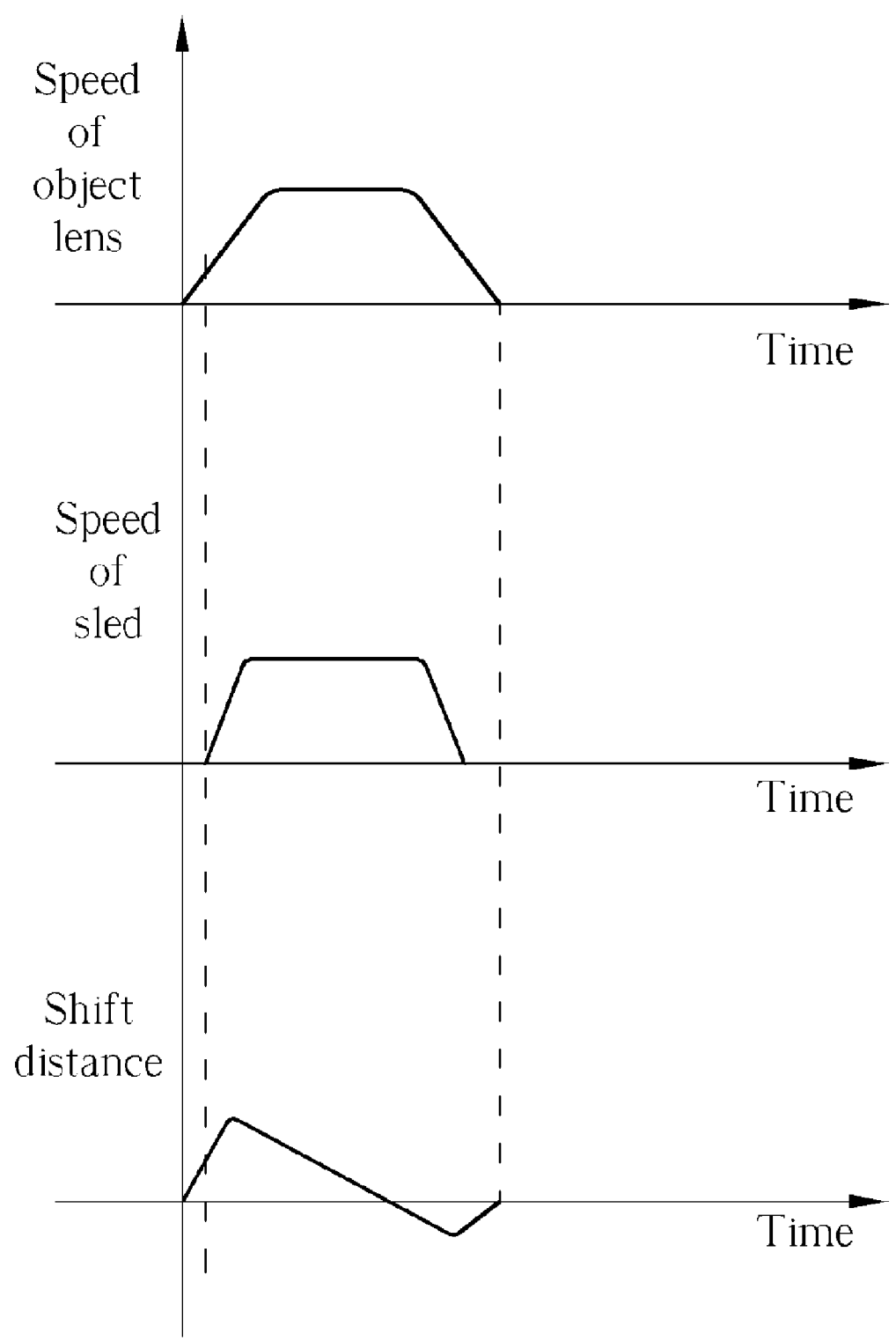
FIG. 6 is a diagram illustrating two speed curves of the object lens and the sled shown in FIG. 4 and one curve of the variation of a shift distance.

In summary, the control module 38 estimates the number of required steps that the stepping motor 32 should rotate and drives the stepping motor 32 at the same time when the short seek begins, and then drives sled 35 to move toward the target position. In contrary, the embodiment of the prior art drives the stepping motor 32 when the object lens 46 has a shift distance. Please refer to FIG. 6, which is a diagram illustrating speed curves of the object lens 46 and sled 35 (with pick-up head 36) and variation of the shift distance between the object lens 46 and sled 35 (with the pick-up head 36) in the short seek according to the present invention. In the beginning of the short seek, the object lens 46 moves toward the target track quickly according to the predetermined speed curve, which causes an instant shift distance. At the same time, the control module 38 in FIG. 4 is able to predetermine the position that the object lens 46 will moves to, so it can figure out the number of required steps that the stepping motor 32 should rotate and then move the stepping motor 32 in advance. Therefore, the sled 35 has been moved before there is a big shift distance between the object lens 46 and the sled 35 (with the pick-up head 36). As a result, the shift distance in this embodiment is smaller than the one in prior art. In the middle of the short seek, the shift distance is kept within a controllable range because the sled 35 and the object lens 46 move at the same time. As a result, optical signals correspond to greater signal quality, and the system becomes more stable. At the end of the short seek, the control module 38 in FIG. 4 stops driving the stepping motor 32. The object lens 46 has arrived at the target track and stops when the sled 35 stops. The short seek is then completed. If there is still a shift distance after the sled 35 finishes moving according to the estimated steps and stops, the control module 38 will drive the stepping motor 32 again for moving the sled 35 (with the pick-up head 36) for a few steps, which means the sled 35 will not move back owing to the prior art reverse shift distance. Generally, the present invention overcomes the drawback of the slow dynamic characteristic of the sled 35 via pre-moving the sled 35 (with the pick-up head 36) toward the target position at the beginning of the short seek and making use of the stepping motor 32 to precisely locate the sled 35 at the target position. The present invention also avoids the big shift distance between the object lens 46 and the pick-up head 36, and improves the system stability.

Figure 7:
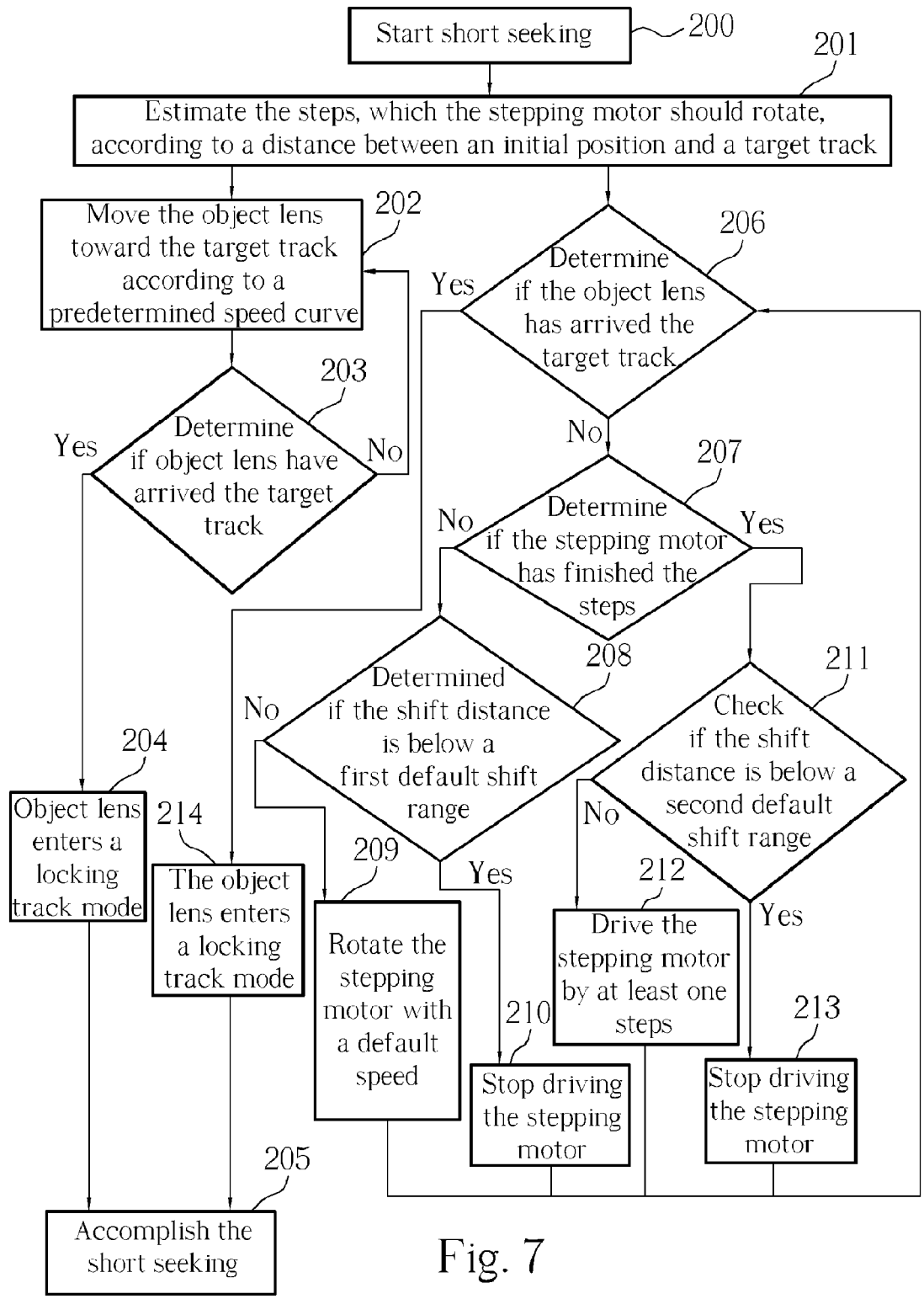
FIG. 7 is a detailed flow chart of the method according to the embodiment of the present invention.

In practice, if the stepping motor 32 rotates too fast (compared with the predetermined speed of the object lens 46), there might also be a big shift distance over the normal range. In order to ensure the quality of optical signals in a short seek, we apply a default shift distance to determine if the shift distance is too big and activate related adjustments. Please refer to FIG. 7, which is a detailed flow chart of the method according to the embodiment of the present invention. The flow includes following steps:

Step 200: Start a short seek;

Step 201: Estimate the number of required steps that stepping motor 32 should rotate with the control module 38 in FIG. 4, according to a distance between an initial position and a target track, and then go to step 202;

Step 202: Utilize the control module 38 shown in FIG. 4 to move the object lens 46 toward the target track according to a predetermined speed curve, and then perform step 203 and step 206 at the same time;

Step 203: Determine if the object lens 46 has arrived at the target track. If the object lens 46 has arrived at the target track, go to step 204; otherwise, continue moving the object lens 46 and repeat step 203 again. In practice, the control module 38 in FIG. 4 determines whether the object lens 46 has arrived at the target track through related optical signals generated from the optical disk 42;

Step 204: Control the object lens 46 to enter a track-locking mode (sequential access mode) after the object lens 46 arrives at the target track, and then go to step 205. That is, the object lens 46 locks onto the target track precisely and reads the data stored on the optical disk 22 sequentially;

Step 205: Accomplish the short seek;

Step 206: Determine if the object lens 46 has arrived at the target track. If the object lens 46 has arrived at the target track, go to step 214; otherwise, go to step 207;

Step 207: Determine if the stepping motor 32 has finished rotating according to the required steps. If the stepping motor 32 has finished rotating according to the required steps, go to step 211; otherwise go to step 208. In practice, the stepping motor 32 can work with a counter. The counter counts the number of steps that the stepping motor 32 rotates for determining if the stepping motor 32 has accomplished the required steps, and for determining if the pick-up head 36 and sled 35 have arrived at the target position;

Step 208: Before the object lens 46 and the pick-up head 36 arrive at the target track, determine if the shift distance between the object lens 46 and the pick-up head 36 is below a first default shift range, that means the shift distance is within a preferred range. If so, then go to step 210; if not, it means the shift distance is beyond the first default shift range, so go to step 209;

Step 209: Rotate the stepping motor 32 by at least one step according to a default speed for moving the pick-up head 36 and the sled 35, and repeat the check procedure in step 206 that reduces the shift distance between the object lens 46 and the pick-up head 36 dynamically and ensures the stability of optical signals and system;

Step 210: Stop utilizing the stepping motor 32 to drive the sled 35 and the pick-up head 36, drive the stepping motor 32 to hold its current status, and go back to the check procedure in step 206;

Step 211: When the stepping motor 32 has achieved all the steps and the pick-up head 36 has arrived at the target position, check if the shift distance between the object lens 46 and the pick-up head 36 is below a second default shift range. If it is below, then it means the shift distance between the object lens 46 and the pick-up head 36 will not influence the quality of the optical signals, so go to step 213. If it is not below, then go to step 212 because the shift distance is beyond tolerance;

Step 212: Drive the stepping motor 32 for moving the pick-up head 36 and the sled 35 forward by at least one step, and then go back to the checking procedure in step 206;

Step 213: Stop utilizing the stepping motor 32 to drive the pick-up head 36 and the sled 35, drive the stepping motor 32 to hold its current status, and then go back to the check procedure in step 206; and Step 214: After the object lens 46 arrives at the target track, the object lens 46 enters a track-locking mode and goes to step 205 for accomplishing the short seek.

In this embodiment, steps 202-205 are procedures that drive the object lens 46, and steps 206-214 are procedures that drive the stepping motor 32, sled 35, and pick-up head 36. Both of them can be independent procedures or interactive procedures. In general, a jumping operation includes a long seek, which is fast, and a short seek, which is more precise. However, the performance of the optical storage system usually depends on the final short seek. In the prior art, utilizing of the shift distance between the object lens and the sled creates oscillation and lowers the quality of optical signals so that the jumping distance covered by the short seek and the jumping speed are both limited. In the present invention, the stepping motor, which positions the sled precisely, drives the sled and pick-up head of the optical disk drive in advance. It then estimates the shift distance of the sled and pick-up head before a short seek is started, and converts the shift distance into the number of required steps that the stepping motor should rotate. Afterwards it determines if it is necessary to drive the stepping motor (as in step 207 to step 210) according to the shift distance between the object lens and the pick-up head while the object lens is moving, pre-moves the sled and pick-up head around the target position, and then precisely moves the object lens to the target track. At the end of the short seek, the present invention moves the object lens to the target track precisely without moving the sled or with the sled sliding slowly (steps 212 and 213 in FIG. 7). Then the short seek is accomplished. Although the sled has a slow dynamic characteristic, it is positioned precisely with the stepping motor. In other words, it overcomes the problem of the sled being late in starting and stopping by pre-moving and pre-stopping the sled. In this way, the shift distance between the object lens and pick-up head is sure to be within a normal range for a better quality of optical signals and stability of the optical storage system (optical disk drive). Therefore, the allowable maximum distance covered by a short seek can be increased and speed of the object lens can be increased for faster jumping according to the present invention. All of this allows the optical storage system (optical disk drive) to have better performance.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for controlling a stepping motor in an optical storage system, which comprises a pick-up head for achieving a short seek, and an object lens, the method comprising:
   calculating a number of steps that the stepping motor should rotate;
   moving the pick-up head toward a target position by having the stepping motor rotate according to the number of steps;
   determining a shift distance between the object lens and the center of the pick-up head; and
   controlling movement of the pick-up head according to the shift distance.

2. The method of claim 1, wherein the pick-up head is placed on a sled, the sled being electrically connected to the stepping motor, and the step of moving the pick-up head toward a target position by having the stepping motor rotate according to the number of steps further comprises:
   utilizing the stepping motor for driving the sled to move the pick-up head toward the target position.

3. The method of claim 1, further comprising moving the object lens toward a target track.

4. The method of claim 3 further comprising:
   moving the object lens from an initial track to the target track according to a predetermined speed; and
   determining at least one step according to a distance between the initial track and the target track.

5. The method of claim 3, wherein the step of selectively stopping movement of the pick-up head according to the shift distance further comprises:
   stopping utilizing the stepping motor to move the pick-up head if the shift distance is lower than a predetermined shift range, while the object lens has not reached the target track, and the stepping motor has not moved the pick-up head to the target position; and
   utilizing the stepping motor to move the pick-up head if the shift distance is greater than the predetermined shift range, while the object lens has not reached the target track, and the stepping motor has not moved the pick-up head to the target position.

6. The method of claim 1, wherein the optical storage system further comprises a control module for controlling operations of the stepping motor, the pick-up head, and the object lens.

7. A method of achieving a short seek in an optical storage system, the optical system having a stepping motor, a pick-up head, and an object lens, the method comprising:
   (a) calculating a number of steps that the stepping motor should rotate;
   (b) after step (a), utilizing the stepping motor to move the pick-up head toward a target position;
   (c) determining if the object lens has reached the target track, wherein the short seek is finished if the object lens has reached the target track; otherwise, step (d) is performed; and
   (d) continuing to move the object lens until the pick-up head has reached the target position and then returning to step (c); otherwise, repeating step (d).

8. The method of claim 7 further comprising:
   (e) during step (d), when the pick-up head has not reached the target position and the object lens has not reached the target track, checking if a shift distance is lower than a predetermined shift range; if true, then stopping utilizing the stepping motor to move the pick-up head; otherwise, going to step(f); and
   (f) continuing to utilize the stepping motor to drive the pick-up head according to a predetermined speed, and then returning to step (e);
   wherein the shift distance is between the object lens and a center of the pick-up head.

9. The method of claim 7, wherein the pick-up head is placed on a sled, the sled is electrically connected to the stepping motor, and step (b) utilizes the stepping motor to drive the sled.

10. The method of claim 7 further comprising: a step (b') to move the object lens toward a target track, wherein the step (b') and step (b) comprise:
    (g) in step (b'), moving the object lens from an initial track to the target track according to a predetermined speed curve; and
    (h) in step (b), calculating the number of steps that the stepping motor should rotate according to a distance between the initial track and the target track.

11. The method of claim 10, wherein the stepping motor and the object lens move along a radial direction.

12. The method of claim 7, wherein the optical storage system further comprises a control module for controlling operations of the stepping motor, the pick-up head, and the object lens.

13. An optical storage system comprising:
    a sled placed movably in the optical storage system;
    a pick-up head placed on the sled;
    an object lens placed movably on the pick-up head;
    a stepping motor electrically connected to the sled for driving the sled to move the pick-up head, wherein the stepping motor stops the sled and the pick-up head when a shift distance corresponding to a distance between the pick-up head and the object lens is lower than a predetermined range; and
    a control module electrically connected to the stepping motor, the pick-up head, and the object lens for controlling operations of the stepping motor, the pick-up head, and the object lens and determining the shift distance and the predetermined range.

14. The optical storage system of claim 13, wherein the sled and the object lens move along a radial direction.

15. The optical storage system of claim 13, wherein the shift distance is a distance between the object lens and a center of the pick-up head.

16. The optical storage system of claim 13, wherein the stepping motor is implemented for a short seek.

17. An optical storage system comprising:
    a sled placed movably in the optical storage system;
    a pick-up head placed on the sled;
    an object lens placed movably on the pick-up head;
    a stepping motor, electrically connected to the sled, for driving the sled to move the pick-up head if a shift distance corresponding to a distance between the pick-up head and the object lens is greater than a predetermined range and the object lens has not reached a target position, and stopping the sled and the pick-up head when the shift distance is lower than the predetermined range and the object lens has not reached the target position; and
    a control module electrically connected to the stepping motor, the pick-up head, and the object lens for calculating a number of steps that the stepping motor should rotate and controlling operations of the stepping motor, the pick-up head, and the object lens and determining the shift distance and the predetermined range.

18. A method for controlling a stepping motor in an optical storage system, which comprises a pick-up head for achieving a short seek and an object lens placed movably on the pick-up head, the method comprising:

calculating a number of steps that the stepping motor should rotate;

moving the pick-up head toward a target position by having the stepping motor rotate according to the number of steps;

moving the object lens toward a target track;

comparing a shift distance corresponding to a distance between the pick-up head and the object lens with a predetermined shift range;

stopping utilizing the stepping motor to move the pick-up head if the shift distance is lower than the predetermined shift range, while the object lens has not reached the target track, and the stepping motor has not rotated according to the number of steps; and utilizing the stepping motor to move the pick-up head if the shift distance is greater than the predetermined shift range, while the object lens has not reached the target track, and the stepping motor has not rotated according to the number of steps.

* * * * *